United States Patent
Itoh et al.

(10) Patent No.: US 8,919,108 B2
(45) Date of Patent: Dec. 30, 2014

(54) EXHAUST GAS TEMPERATURE RAISING APPARATUS AND A METHOD FOR REMOVAL OF FUEL SUPPLY VALVE CLOGGING

(75) Inventors: Kazuhiro Itoh, Mishima (JP); Junya Nakajima, Susono (JP); Shinya Hirota, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 31 days.

(21) Appl. No.: 13/812,007

(22) PCT Filed: Jul. 30, 2010

(86) PCT No.: PCT/JP2010/062913
§ 371 (c)(1),
(2), (4) Date: Jan. 24, 2013

(87) PCT Pub. No.: WO2012/014316
PCT Pub. Date: Feb. 2, 2012

(65) Prior Publication Data
US 2013/0118156 A1 May 16, 2013

(51) Int. Cl.
*F01N 3/00* (2006.01)
*F01N 3/02* (2006.01)
*F01N 3/10* (2006.01)
*F01N 3/20* (2006.01)
*F01N 3/025* (2006.01)

(52) U.S. Cl.
CPC .......... *F01N 3/0256* (2013.01); *F01N 2610/03* (2013.01); *F01N 3/206* (2013.01); *F01N 2610/1453* (2013.01); *F01N 3/0253* (2013.01); *F01N 2610/1493* (2013.01)
USPC .................. 60/295; 60/286; 60/289

(58) Field of Classification Search
USPC ........................................... 60/286, 289, 295
See application file for complete search history.

(56) References Cited

U.S. PATENT DOCUMENTS

2008/0295492 A1* 12/2008 Karkkainen et al. ............ 60/286

FOREIGN PATENT DOCUMENTS

| JP | 05-33629 | 2/1993 |
| JP | 2003-222019 A | 8/2003 |
| JP | 2007-146700 A | 6/2007 |

OTHER PUBLICATIONS

Japanese Patent Office, International Search Report in International Application No. PCT/JP2010/062913, dated Oct. 12, 2010.

* cited by examiner

*Primary Examiner* — Audrey K Bradley
*Assistant Examiner* — Dapinder Singh
(74) *Attorney, Agent, or Firm* — Kenyon & Kenyon LLP

(57) ABSTRACT

The present invention is intended to provide a technique which serves to suppress unburnt HC from being discharged to a downstream side, when fuel is injected from a fuel supply valve for removing clogging thereof. The present invention is provided with a fuel supply valve that supplies fuel to an exhaust passage of an internal combustion engine, and an ignition unit that ignites the fuel supplied from the fuel supply valve, wherein in cases where there is a possibility that clogging may occur in an injection hole of the fuel supply valve, fuel for removal of clogging is injected from the fuel supply valve. An amount of the fuel to be injected from the fuel supply valve for removing clogging thereof is an amount of fuel which is able to be combusted by being ignited by means of the ignition unit.

7 Claims, 6 Drawing Sheets

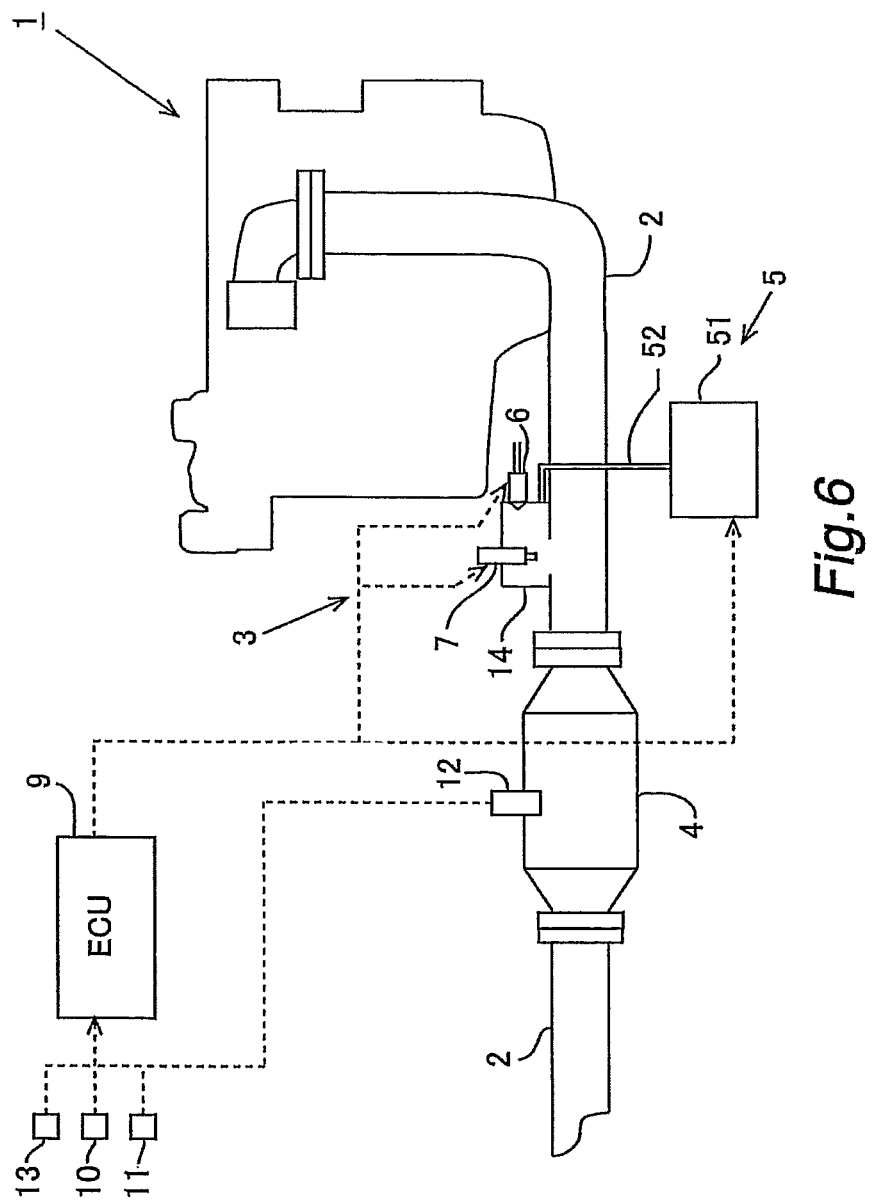

EXHAUST GAS TEMPERATURE RAISING APPARATUS AND A METHOD FOR REMOVAL OF FUEL SUPPLY VALVE CLOGGING

This is a 371 national phase application of PCT/JP2010/062913 filed 30 Jul. 2010, the contents of which are incorporated herein by reference.

TECHNICAL FIELD

The present invention relates to an exhaust gas temperature raising apparatus in which fuel directed to an exhaust passage of an internal combustion engine is supplied so that it is caused to burn therein to raise the temperature of an exhaust gas in the exhaust passage of the internal combustion engine, and also relates to a method for removing clogging of a fuel supply valve used therein.

BACKGROUND ART

In a reducing agent supply device which is arranged in an exhaust passage of an internal combustion engine, there has been disclosed a technique in which the time at which a reducing agent supply valve gets clogged is estimated, and a small amount of reducing agent is injected from the reducing agent supply valve before the estimated time of occurrence of clogging, or an amount of reducing agent increased more than an ordinary amount is injected from the reducing agent supply valve after the estimated time of occurrence of clogging (for example, refer to a first patent document). In the first patent document, the clogging of a nozzle (or injection hole) of the reducing agent supply valve, which serves to inject the reducing agent, is suppressed in this manner.

PRIOR ART DOCUMENTS

Patent Documents

Patent Document 1: Japanese patent application laid-open No. 2003-222019
Patent Document 2: Japanese patent application laid-open No. H05-033629
Patent Document 3: Japanese patent application laid-open No. 2007-146700

SUMMARY OF THE INVENTION

Problems to be Solved by the Invention

However, among such devices as described in the first patent document, in the case of those which supply fuel to an exhaust passage of an internal combustion engine, if an excessive amount of fuel is injected for removing the clogging of an injection hole of a fuel supply valve, there will be a possibility that fuel economy may be deteriorated, or a possibility that unburnt HC (unburnt fuel) may be excessively or unnecessarily discharged to a downstream side. When unburnt HC is discharged too much, deterioration of an exhaust gas purification catalyst due to HC poisoning may progress, and in particular in an NOx selective reduction catalyst, the deterioration thereof may progress to a large extent under the influence of HC poisoning, and in addition, there is a possibility that exhaust emissions may deteriorate.

The present invention has been made in view of the above-mentioned circumstances, and has for its object to provide a technique which serves to suppress unburnt HC from being discharged to a downstream side, in cases where fuel is injected from a fuel supply valve for removing clogging thereof.

Means for Solving the Problems

In the present invention, the following construction is adopted. That is, the present invention resides in an exhaust gas temperature raising apparatus which is provided with:

a fuel supply valve that supplies fuel to an exhaust passage of an internal combustion engine; and
  an ignition unit that ignites the fuel supplied from said fuel supply valve;
  wherein in cases where there is a possibility that clogging may occur in an injection hole of said fuel supply valve, fuel for removal of clogging is injected from said fuel supply valve; and
  wherein an amount of the fuel to be injected from said fuel supply valve for removing clogging thereof is an amount of fuel which is able to be combusted by being ignited by means of said ignition unit.

Here, note that the amount of fuel which is able to be combusted by being ignited by means of the ignition unit is an amount of fuel which will combust or burn when ignited by the ignition unit, with almost no unburnt HC (unburnt fuel) being discharged to the downstream side, thus resulting in that no adverse effect is exerted on exhaust emissions.

According to the present invention, at the time of injecting fuel from the fuel supply valve for removal of the clogging thereof, the amount of fuel which is able to be combusted by being ignited by means of the ignition unit will be injected. As a result of this, the fuel injected from the fuel supply valve for removing the clogging thereof is combusted when ignited by the ignition unit, thus making it possible to suppress unburnt HC from being discharged to the downstream side. Accordingly, the HC poisoning of the exhaust gas purification catalyst due to the unburnt HC flowing into the downstream exhaust gas purification catalyst can be reduced, thereby making it possible to suppress the deterioration of the exhaust gas purification catalyst. In addition, it is possible to suppress the deterioration of exhaust emissions due to the unburnt HC released into ambient atmosphere.

It is preferable that the injection of fuel for removal of clogging from said fuel supply valve be carried out when a space velocity of the exhaust gas is equal to or less than a predetermined velocity, which is a threshold value based on which it is determined whether even if the fuel to be injected for removal of clogging is ignited by said ignition unit, a part of the fuel may become unburned or not.

Here, the predetermined velocity is a threshold value of a space velocity of the exhaust gas based on which it is determined whether even if the fuel to be injected for removal of clogging is ignited by the ignition unit, a part of the fuel may become unburned or not, wherein when the space velocity of the exhaust gas is equal to or less than the predetermined velocity, if the fuel to be injected for removal of clogging is ignited by the ignition unit, even a part of the fuel does not remain substantially unburned.

According to the present invention, the injection of fuel for removal of clogging from the fuel supply valve is carried out when the space velocity of the exhaust gas is equal to or less than the predetermined velocity, and hence, if the fuel to be injected for removal of clogging is ignited by the ignition unit, even a part of the fuel does not remain substantially unburned. As a result of this, the fuel injected from the fuel supply valve for removing the clogging thereof is combusted when ignited by the ignition unit, thus making it possible to avoid unburnt HC from being discharged to the downstream side.

It is preferable that the amount of fuel which is able to be combusted by being ignited by said ignition unit, which is the amount of the fuel to be injected from said fuel supply valve for removing clogging thereof, be calculated by taking into consideration a phenomenon that as the space velocity of the exhaust gas increases, there increases a possibility that even if the fuel to be injected for removal of clogging is ignited by said ignition unit, a part of the fuel may become unburned.

According to the present invention, the amount of fuel which is able to be combusted by being ignited by means of the ignition unit is calculated in consideration of the space velocity of the exhaust gas, in such a manner that it becomes a small amount when the space velocity of the exhaust gas is fast, whereas it becomes a large amount when the space velocity of the exhaust gas is slow. As a result of this, as the space velocity of the exhaust gas becomes slower, the larger amount of fuel is injected from the fuel supply valve, so that it becomes easy to remove the clogging of the fuel supply valve.

In the present invention, the following construction is adopted. That is, the present invention resides in an exhaust gas temperature raising apparatus which is provided with:
  a fuel supply valve that supplies fuel to an exhaust passage of an internal combustion engine; and
  an ignition unit that ignites the fuel supplied from said fuel supply valve;
  wherein in cases where there is a possibility that clogging may occur in an injection hole of said fuel supply valve, fuel for removal of clogging is injected from said fuel supply valve;
  wherein said apparatus is further provided with a catalyst that is arranged in said exhaust passage at a location downstream of said ignition unit, and is able to oxidize and adsorb the fuel; and
  wherein the amount of the fuel to be injected from said fuel supply valve for removal of the clogging thereof is an amount of fuel which is able to be combusted by being ignited by means of said ignition unit, or an amount of fuel with which a part of the fuel that becomes unburned after ignited by said ignition unit is able to be oxidized and adsorbed by said catalyst.

Here, the amount of fuel with which a part of fuel that becomes unburned or uncombusted after ignited by the ignition unit is able to be oxidized and adsorbed by the catalyst is an amount of fuel with which a part of the fuel becomes unburned after being ignited by the ignition unit and flows into the catalyst, but this part of fuel is oxidized and adsorbed by the catalyst, so that almost no unburnt HC (unburnt fuel) is discharged to the downstream side, thus exerting no adverse effect on exhaust emissions.

According to the present invention, at the time of injecting fuel from the fuel supply valve for removal of the clogging thereof, an amount of fuel which is able to be combusted by being ignited by means of the ignition unit, or an amount of fuel with which a part of the fuel that becomes unburned after ignited by the ignition unit is able to be oxidized and adsorbed by the catalyst, will be injected. As a result of this, the fuel injected from the fuel supply valve for removal of the clogging thereof is combusted or burned when ignited by the ignition unit, or a part of the fuel which becomes unburned after ignited by the ignition unit is oxidized and adsorbed by the catalyst, thus making it possible to suppress unburnt HC from being discharged to the downstream side. Accordingly, it is possible to suppress the deterioration of exhaust emissions due to the unburnt HC released into ambient atmosphere. In addition, an amount of fuel equal to or more than the amount of fuel which is able to be combusted by being ignited by means of the ignition unit is injected from the fuel supply valve, so that it becomes easy to remove the clogging of the fuel supply valve.

It is preferable that the amount of fuel which is able to be combusted by being ignited by means of said ignition unit, or the amount of fuel with which a part of the fuel that becomes unburned after ignited by said ignition unit is able to be oxidized and adsorbed by said catalyst, which is the amount of the fuel to be injected from said fuel supply valve for removal of the clogging thereof, be calculated in consideration of a state of activity of said catalyst.

According to the present invention, the amount of fuel which is able to be combusted by being ignited by means of the ignition unit, or the amount of fuel with which a part of the fuel that becomes unburned after ignited by the ignition unit is able to be oxidized and adsorbed by the catalyst, is calculated in consideration of a state of activity of the catalyst, in such a manner that it becomes a small amount when the active state of the catalyst is low, or when the catalyst is in an inactive state, whereas it becomes a large amount when the active state of the catalyst is high. As a result of this, the higher the active state of the catalyst, the larger becomes the amount of fuel injected from the fuel supply valve, so that it becomes easy to remove the clogging of the fuel supply valve.

In the present invention, the following construction is adopted. That is, the present invention resides in a method for removal of fuel supply valve clogging, in which provision is made for:
  a fuel supply valve that supplies fuel to an exhaust passage of an internal combustion engine; and
  an ignition unit that ignites the fuel supplied from said fuel supply valve;
  wherein in cases where there is a possibility that clogging may occur in an injection hole of said fuel supply valve, said fuel supply valve injects an amount of fuel which is able to be combusted by being ignited by means of said ignition unit in order to remove the clogging; and
  wherein said ignition unit ignites the fuel injected by said fuel supply valve.

According to the present invention, at the time of injecting fuel from the fuel supply valve for removal of the clogging thereof, the amount of fuel which is able to be combusted by being ignited by means of the ignition unit will be injected. As a result of this, the fuel injected from the fuel supply valve for removing the clogging thereof is combusted when ignited by the ignition unit, thus making it possible to suppress unburnt HC from being discharged to the downstream side.

In the present invention, the following construction is adopted. That is, the present invention resides in a method for removal of fuel supply valve clogging, in which provision is made for:
  a fuel supply valve that supplies fuel to an exhaust passage of an internal combustion engine;
  an ignition unit that ignites the fuel supplied from said fuel supply valve; and
  a catalyst that is arranged in said exhaust passage at a location downstream of said ignition unit, and is able to oxidize and adsorb the fuel;
  wherein in cases where there is a possibility that clogging may occur in an injection hole of said fuel supply valve, said fuel supply valve injects an amount of fuel which is able to be combusted by being ignited by means of said ignition unit, or an amount of fuel with which a part of the fuel that becomes unburned after ignited by said ignition unit is able to be oxidized and adsorbed by said catalyst, in order to remove the clogging; and wherein said ignition unit ignites the fuel injected by said fuel supply valve.

According to the present invention, at the time of injecting fuel from the fuel supply valve for removal of the clogging thereof, an amount of fuel which is able to be combusted by being ignited by means of the ignition unit, or an amount of fuel with which a part of the fuel that becomes unburned after ignited by the ignition unit is able to be oxidized and adsorbed by the catalyst, will be injected. As a result of this, the fuel injected from the fuel supply valve for removal of the clogging thereof is combusted or burned when ignited by the ignition unit, or a part of the fuel which becomes unburned after ignited by the ignition unit is oxidized and adsorbed by the catalyst, thus making it possible to suppress unburnt HC from being discharged to the downstream side.

Advantageous Effect of the Invention

According to the present invention, it is possible to suppress unburnt HC from being discharged to a downstream side, when fuel is injected from a fuel supply valve for removing clogging thereof.

BRIEF DESCRIPTION OF THE DRAWINGS

FIG. 6 is a view showing the schematic construction of an exhaust gas temperature raising apparatus according to another example of the present invention.

EMBODIMENTS FOR CARRYING OUT THE INVENTION

Hereinafter, specific embodiments of the present invention will be described.

First Embodiment

Figure 1:
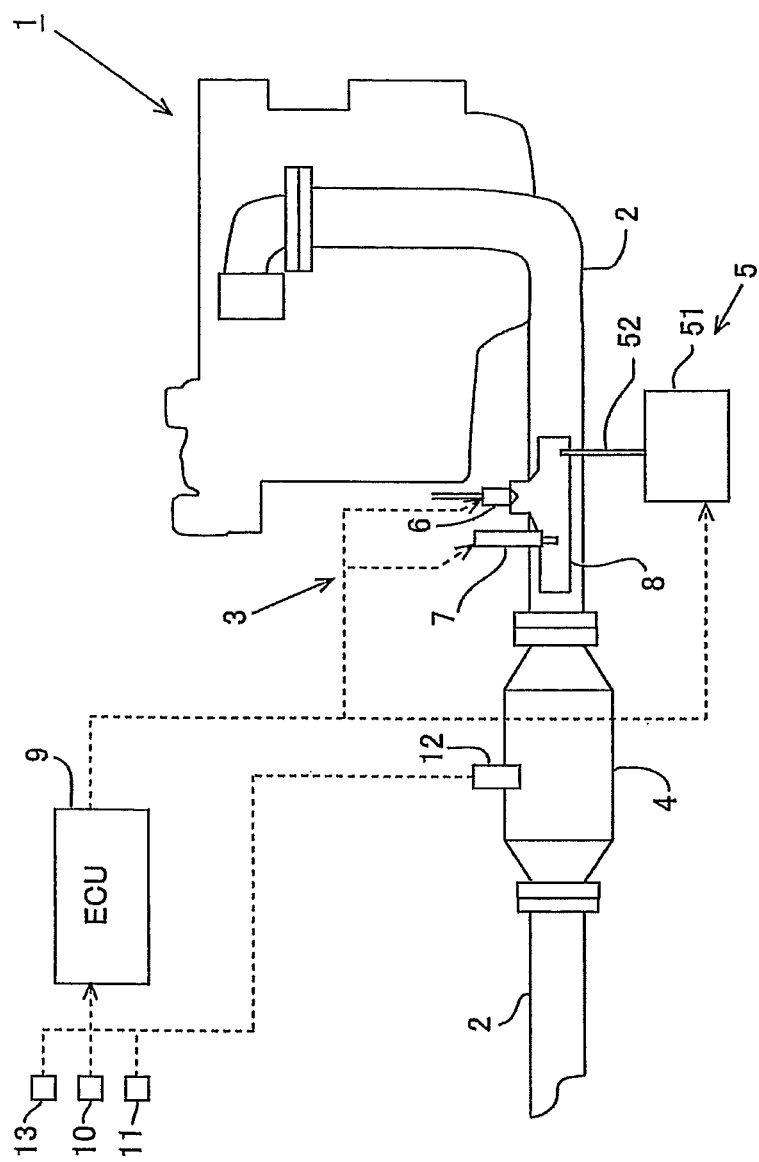
FIG. 1 is a view showing the schematic construction of an exhaust gas temperature raising apparatus according to a first embodiment of the present invention.

FIG. 1 is a view showing the schematic construction of an exhaust gas temperature raising apparatus according to a first embodiment of the present invention. An internal combustion engine 1 shown in FIG. 1 is a four-stroke cycle diesel engine. Here, noted that the internal combustion engine 1 is not limited to a diesel engine, but may be another type of engine such as a gasoline engine, etc.

An exhaust passage 2, through which an exhaust gas to be discharged to ambient atmosphere after having been combusted in the internal combustion engine is caused to pass, is connected to the internal combustion engine 1. An exhaust gas temperature raising apparatus 3 is arranged in the exhaust passage 2. An exhaust gas purification catalyst 4 is arranged in the exhaust passage 2 at a location downstream of the exhaust gas temperature raising apparatus 3. The exhaust gas temperature raising apparatus 3 serves to raise the temperature of the exhaust gas, and the exhaust gas thus heated to a high temperature flows into the exhaust gas purification catalyst 4. The exhaust gas purification catalyst 4 is raised in temperature and is thereby activated by the use of the exhaust gas of the high temperature, so that it becomes able to exhibit its function. As the exhaust gas purification catalyst 4, there can be mentioned an NOx selective reduction catalyst (an SCR catalyst), an NOx storage reduction catalyst, an oxidation catalyst, a three-way catalyst, and so on.

Here, note that a diesel particulate filter (DPF), which serves to trap particulate matter (PM) in the exhaust gas, may be arranged in the exhaust passage 2 at a location downstream of the exhaust gas temperature raising apparatus 3. In this case, the exhaust gas temperature raising apparatus 3 serves to raise the temperature of the exhaust gas, and the exhaust gas thus heated to a high temperature flows into the diesel particulate filter. The diesel particulate filter oxidizes and removes the particulate matter trapped by the diesel particulate filter in a forced manner, by the use of the exhaust gas of the high temperature flowing into the diesel particulate filter.

Note that the exhaust gas temperature raising apparatus 3 does not always raise the temperature of the exhaust gas, but instead, carries out the raising in temperature of the exhaust gas at the timing at which the exhaust gas purification catalyst 4 is activated, or at the timing at which the particulate matter trapped by the diesel particulate filter is oxidized and removed in a forced manner, as mentioned above.

The exhaust gas temperature raising apparatus 3 arranged in the exhaust passage at a location upstream of the exhaust gas purification catalyst 4 is provided with, from an upstream side in the direction of flow of the exhaust gas, an air supply device 5, a fuel supply valve 6, an ignition device 7, and a combustion tube 8 surrounding these devices and valve.

The air supply device 5 serves to supply air to the interior of the exhaust passage 2 (the interior of the combustion tube 8) from an air pump 51 through an air supply passage 52, so that the oxygen concentration of the exhaust gas in the combustion tube 8 is caused to rise.

Figure 2:
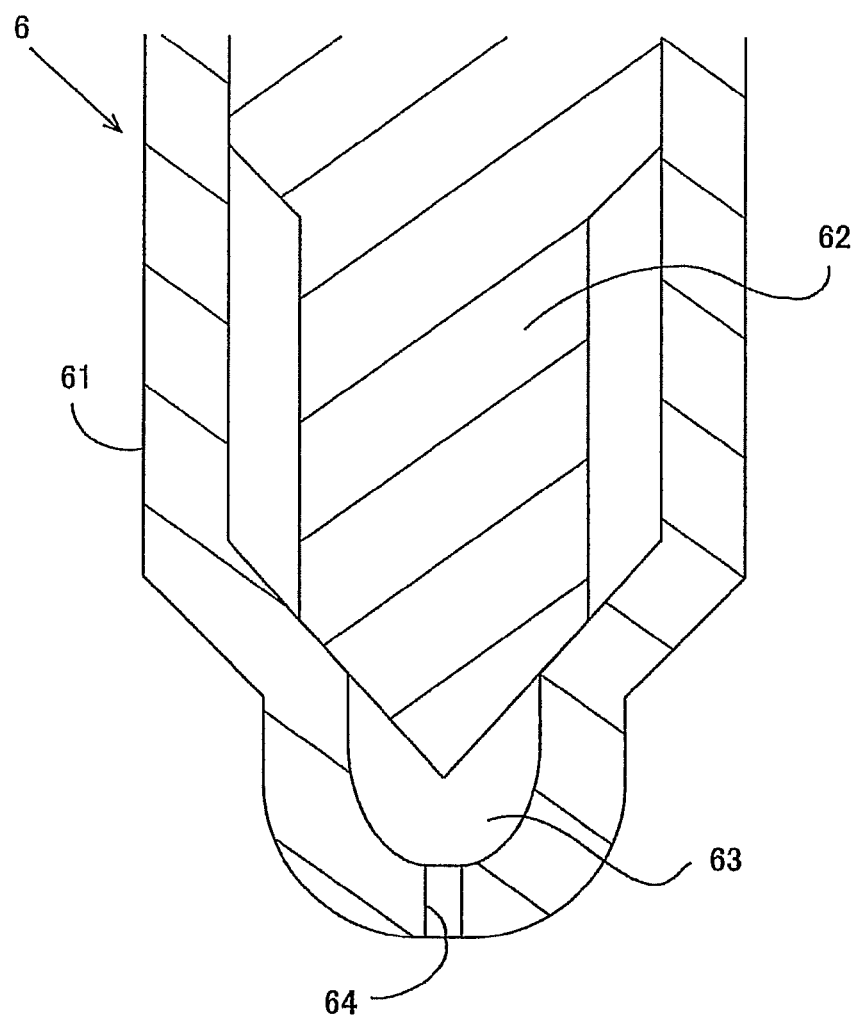
FIG. 2 is a view showing the schematic construction of a tip end portion of a fuel supply valve according to the first embodiment.

The fuel supply valve 6 is arranged in the exhaust passage 2 of the internal combustion engine 1, and serves to supply the fuel in an unillustrated fuel tank to the interior of the exhaust passage 2 (the interior of the combustion tube 8). FIG. 2 is a view showing the schematic construction of a tip end portion of the fuel supply valve 6. The fuel supply valve 6 is provided with a nozzle body 61, a needle 62 that is received in the nozzle body 61 and carries out a reciprocating movement by means of a signal from an ECU 9, a sack 63 in the shape of a bag that once stores fuel which flows out at the time when the needle 62 is opened, and an injection hole 64 formed in a part of the sack 63 so as to extend from the interior thereof to the outside thereof. When the fuel supply valve 6 does not inject fuel, the tip portion of the needle 62 plugs up an opening portion of the sack 63, thereby stopping the circulation of fuel. On the other hand, when the fuel supply valve 6 injects fuel, the needle 62 is moved away from the sack 63 by means of a signal from the ECU 9, so that fuel is allowed to flow into the sack 63. When the pressure of fuel in the sack 63 becomes higher than the pressure outside of the sack 63, fuel is injected from the injection hole 64.

The ignition device 7 is arranged in the exhaust passage 2 of the internal combustion engine 1, and serves to fire (ignite) the fuel in the combustion tube 8 supplied from the fuel supply valve 6. A device for causing a spark discharge to be generated, or the like is used as the ignition device 7. The ignition device 7 in this embodiment corresponds to an ignition unit of the present invention.

The combustion tube 8 is arranged in the inside of the exhaust passage 2 and has a cylindrical or tubular shape with its upstream side and its downstream side being opened, wherein air from the air supply device 5 and fuel from the fuel supply valve 6 are supplied to the interior of the combustion tube 8, so that the ignition device 7 can carry out ignition in a state where these air and fuel are mixed with each other. The combustion tube 8, being arranged in the inside of the exhaust passage 2, serves to cause the air from the air supply device 5 and the fuel from the fuel supply valve 6 to be mixed with each other without being diffused in the entire interior of the exhaust passage 2 to an excessive extent. In addition, the combustion tube 8 also serves to decrease the influence of the exhaust gas flowing through the interior of the exhaust passage 2 with respect to the exhaust gas temperature raising apparatus 3. As a result of this, the exhaust gas temperature raising apparatus 3 can cause fuel to combust in a stable manner.

In the internal combustion engine 1, there is arranged in combination therewith an ECU (Electronic Control Unit) 9 for controlling the internal combustion engine 1. The ECU 9 is a unit that controls the operating state of the internal combustion engine 1 in accordance with the operating conditions of the internal combustion engine 1 and/or driver's requirements. A variety of kinds of sensors such as a crank position sensor 10, an accelerator position sensor 11, a catalyst temperature sensor 12, an air flow meter 13, and so on are connected to the ECU 9 through electrical wiring, so that output signals of these various sensors are inputted to the ECU 9. On the other hand, the air supply device 5, the fuel supply valve 6 and the ignition device 7 are connected to the ECU 9 through electrical wiring, so that these devices and valve are controlled by means of the ECU 9. Then, based on the detected values of the various kinds of sensors, the ECU 9 supplies air from the air supply device 5, and at the same time injects fuel from the fuel supply valve 6, and carries out ignition by means of the ignition device 7, at the timing at which the temperature rise of the exhaust gas is needed. For example, in cases where the bed temperature of the exhaust gas purification catalyst 4, which is detected by the catalyst temperature sensor 12, is equal to or less than a predetermined temperature and it is necessary to warm up the exhaust gas purification catalyst 4, a determination is made that it is the timing at which the temperature rise of the exhaust gas is needed. In addition, at the time when the operation time of the internal combustion engine 1 has elapsed a predetermined period of time and the forced oxidation removal of the particulate matter trapped by the diesel particulate filter is necessary, a determination is made that it is the timing at which the temperature rise of the exhaust gas is needed.

However, with the fuel supply valve 6, after injection of fuel, fuel may remain in the injection hole 64 or the sack 63. The remaining fuel adheres to the injection hole 64 due to the heat of the exhaust gas, and when the amount of adhesion of the fuel increases, there will be a possibility that the injection hole 64 may be clogged. In order to remove this clogging of the injection hole 64 of the fuel supply valve 6, it is carried out to inject fuel from the fuel supply valve 6. However, if an excessive amount of fuel is injected for removing the clogging of the injection hole 64 of the fuel supply valve 6, there will be a possibility that the excessive amount of fuel thus injected may be consumed, thereby deteriorating fuel economy. In addition, although ignition or firing of the fuel is carried out by the ignition device 7 arranged downstream of the fuel supply valve, there is a possibility that the whole of the fuel can not be combusted or burned, but a part of unburnt HC (unburnt fuel) may be discharged too much to a downstream side. If unburnt HC is discharged too much, the unburnt HC will flow into the exhaust gas purification catalyst 4 which is arranged in the exhaust passage 2 at a location downstream of the exhaust gas temperature raising apparatus 3, so that HC poisoning of the exhaust gas purification catalyst 4 may be caused, thus giving rise to a deterioration of the exhaust gas purification catalyst 4 due to the HC poisoning. In particular, in the case of using an NOx selective reduction catalyst as the exhaust gas purification catalyst 4, the deterioration thereof progresses to a large extent under the influence of HC poisoning. Moreover, when unburnt HC is discharged too much, a part of the unburnt HC will be released to ambient atmospheric air from the exhaust passage 2, and the deterioration of exhaust emissions will be caused.

Accordingly, in this embodiment, the amount of fuel to be injected from the fuel supply valve 6 for removal of the clogging thereof is adjusted to an amount of fuel which is able to be combusted by being ignited by means of the ignition device 7 of the exhaust gas temperature raising apparatus 3.

Here, note that the amount of fuel which is able to be combusted by being ignited by means of the ignition device 7 is an amount of fuel which will combust or burn when ignited by the ignition device 7, with almost no unburnt HC being discharged to the downstream side, thus resulting in that no adverse effect is exerted on exhaust emissions. The amount of fuel which is able to be combusted by being ignited by means of the ignition device 7 may be a minimum fixed amount, so that the fuel is able to be combusted in the entire driving state of the internal combustion engine 1, or it may also be a variable amount which varies based on the oxygen concentration of the exhaust gas, the flow rate of the exhaust gas, or the temperature of the exhaust gas, which changes according to the operating state of the internal combustion engine 1. In this embodiment, a variable amount which varies according to the operating state of the internal combustion engine 1 is used for the amount of fuel which is able to be combusted by being ignited by means of the ignition device 7.

According to this embodiment, at the time of injecting fuel from the fuel supply valve 6 for removal of the clogging thereof, the amount of fuel which is able to be combusted by being ignited by means of the ignition device 7 will be injected. As a result of this, the fuel injected from the fuel supply valve 6 for removing the clogging thereof is combusted when ignited by the ignition device 7, thus making it possible to suppress unburnt HC from being discharged to the downstream side. Accordingly, the HC poisoning of the exhaust gas purification catalyst 4 due to the unburnt HC flowing into the exhaust gas purification catalyst 4 arranged downstream of the exhaust gas temperature raising apparatus 3 can be reduced, thereby making it possible to suppress the deterioration of the exhaust gas purification catalyst 4. In addition, it is possible to suppress the deterioration of exhaust emissions due to the unburnt HC released into ambient atmosphere from the exhaust passage 2.

Figure 3:
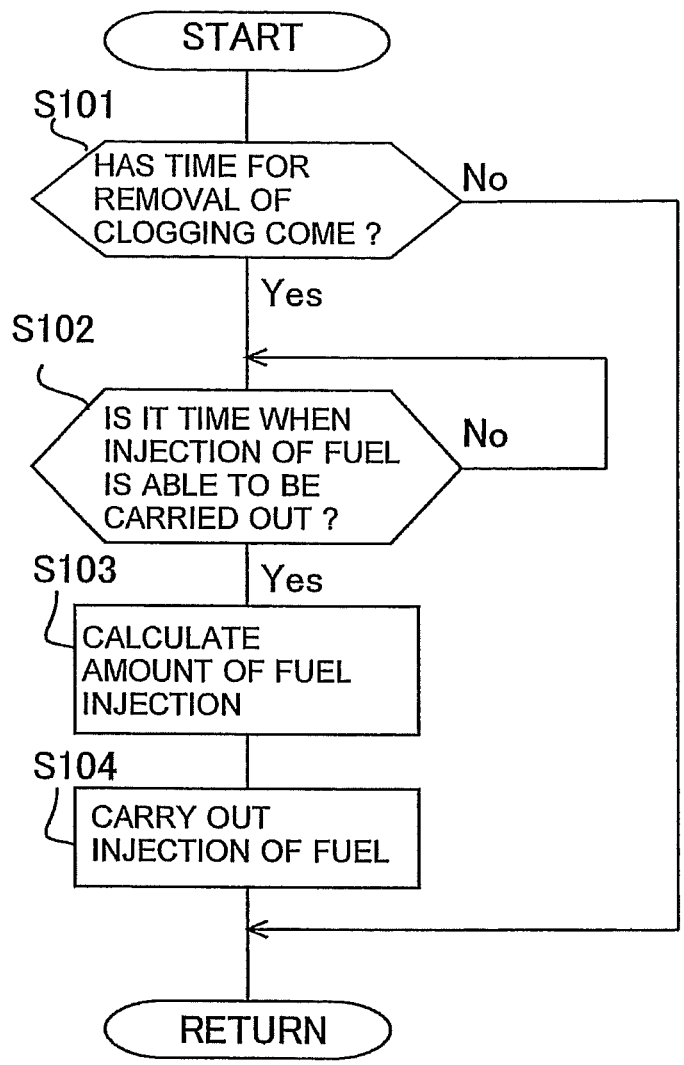
FIG. 3 is a flow chart showing a control routine 1 for removal of clogging of the fuel supply valve according to the first embodiment.

FIG. 3 is a flow chart showing a control routine 1 for removal of the clogging of the fuel supply valve. The control routine 1 for removal of the clogging of the fuel supply valve will be explained based on the flow chart shown in FIG. 3. This routine is repeatedly carried out by means of the ECU 9 at each predetermined time interval.

When this routine is carried out, first in step S101, it is determined whether the time has come for removal of the clogging of the fuel supply valve 6. When a predetermined period of time, which has been set in advance, has elapsed after the last injection of fuel from the fuel supply valve 6 was carried out, a determination is made that the time has come for removal of the clogging of the fuel supply valve 6.

Here, note that when the distance of travel of a vehicle on which the internal combustion engine 1 is mounted, after the last injection of fuel from the fuel supply valve 6 was carried out, has reached a predetermined distance, a determination may be made that the time has come for removal of the clogging of the fuel supply valve 6. In addition, when the operation time of the internal combustion engine 1 has elapsed a predetermined period of time, which has been set in advance, after the last injection of fuel from the fuel supply valve 6 was carried out, a determination may be made that the time has come for removal of the clogging of the fuel supply valve 6.

In step S101, in cases where an affirmative determination is made that the time has come for removal of the clogging of the fuel supply valve 6, the control routine shifts to step S102. On the other hand, in step S101, in cases where a negative determination is made that the time has not yet come for removal of the clogging of the fuel supply valve 6, this routine is once ended.

In step S102, it is determined whether it is the time when the injection of fuel for removal of clogging is able to be carried out. In cases where the operating state of the internal combustion engine 1 is in a high load range, the temperature of the exhaust gas discharged from the internal combustion engine 1 is high. When fuel for removal of clogging is injected at this time and the fuel thus injected is ignited to combust by the ignition device, the temperature of the exhaust gas will become still higher. When the exhaust gas of very high temperature at such a time flows into the exhaust gas purification catalyst 4 which is arranged at a location downstream of the exhaust gas temperature raising apparatus 3, there will be a possibility that the exhaust gas purification catalyst 4 may be caused to rise in temperature to an excessive extent, so that it may be deteriorated or damaged. In addition, in cases where the bed temperature of the exhaust gas purification catalyst 4 is high, too, when the exhaust gas of high temperature flows into the exhaust gas purification catalyst 4 arranged at the downstream side of the exhaust gas temperature raising apparatus 3, there will also be a possibility that the temperature of the exhaust gas purification catalyst 4 may be raised to an excessive extent, thus resulting in the deterioration or damage thereof. Accordingly, a determination as to whether it is the time when the injection of fuel for removal of clogging is able to be carried out is made based on the operating state of the internal combustion engine 1 according to the detected values of the crank position sensor 10 and the accelerator position sensor 11 as well as the bed temperature of the exhaust gas purification catalyst 4 detected by the catalyst temperature sensor 12. Specifically, in cases where the operating state of the internal combustion engine 1 is in a low or a middle load region, or in cases where the bed temperature of the exhaust gas purification catalyst 4 is equal to or less than the predetermined temperature set in advance, a determination is made that it is the time when the injection of fuel for removal of clogging is able to be carried out.

In step S102, in cases where an affirmative determination is made that it is the time when the injection of fuel for removal of clogging is able to be carried out, the control routine shifts to step S103. On the other hand, in step S102, in cases where a negative determination is made that it is the time when the injection of fuel for removal of clogging is not able to be carried out, the control routine returns to the processing of this step (i.e., the processing of this step is repeated).

In step S103, an amount of fuel (an amount of fuel injection) which is able to be combusted by being ignited by means of the ignition device 7, which is an amount of fuel to be injected for removal of clogging, is calculated. In this embodiment, the amount of fuel which is able to be combusted by being ignited by means of the ignition device 7 is set as a variable amount which varies according to the operating state of the internal combustion engine 1. For this reason, the amount of fuel which is able to be combusted by being ignited by means of the ignition device 7 is calculated based on the operating state of the internal combustion engine 1 according to the detected values of the crank position sensor 10 and the accelerator position sensor 11. Specifically, a map has been prepared in which the relation between each operating state of the internal combustion engine 1, and the amount of fuel which is able to be combusted by being ignited by means of the ignition device 7 and which has been obtained in advance in consideration of the oxygen concentration of the exhaust gas, the flow rate of the exhaust gas and the temperature of the exhaust gas in the operating state is set or defined in advance. Then, the amount of fuel which is able to be combusted by being ignited by means of the ignition device 7 is calculated from a specific operating state of the internal combustion engine 1 by using this map. After the amount of fuel which is able to be combusted by being ignited by means of the ignition device 7 is calculated in step S103, the control routine shifts to step S104.

In step S104, the injection of fuel is carried out from the fuel supply valve 6 for removal of the clogging thereof. At this time, air is supplied from the air supply device 5, and at the same time, the fuel is ignited by the ignition device 7. Specifically, air is supplied from the air supply device 5, and at the same time, fuel in the amount which is able to be combusted by being ignited by means of the ignition device 7, being calculated in step S103, is injected from the fuel supply valve 6 in order to remove the clogging thereof. Then, the ignition device 7 ignites the fuel injected from the fuel supply valve 6.

According to this routine as described above, at the time of injecting fuel from the fuel supply valve 6 for removal of the clogging thereof, it is possible to inject the amount of fuel which is able to be combusted by being ignited by means of the ignition device 7, and hence, it is possible to suppress unburnt HC from being discharged to the downstream side.

Second Embodiment

In the second embodiment, clogging removal control of the fuel supply valve 6 is carried out in consideration of the space velocity of the exhaust gas. In this embodiment, the characteristic portion thereof will be explained while omitting the explanation of the portions which are the same as those of the above-mentioned embodiment.

Here, the space velocity (SV) of an exhaust gas is the flow rate of the exhaust gas per unit volume. The flow rate of the exhaust gas can be estimated based on the flow rate of intake air detected by the air flow meter 13. Here, note that the flow rate of the exhaust gas may be directly detected by the provision of an exhaust gas flow rate sensor. In addition, the space velocity of the exhaust gas may be replaced by the flow rate of the exhaust gas or the flow speed of the exhaust gas.

When the space velocity of the exhaust gas passing through the exhaust gas temperature raising apparatus is a fast speed, the speed of the movement of the fuel entrained in the exhaust gas is fast, and hence, even if fuel to be injected for removal of clogging is ignited by the ignition device 7, a part of the fuel becomes unburned. On the other hand, when the space velocity of the exhaust gas passing through the exhaust gas temperature raising apparatus 3 is a slow speed, the speed of the movement of the fuel entrained in the exhaust gas is slow, and hence, when the fuel to be injected for removal of clogging is ignited by the ignition device 7, almost all the fuel is burned or combusted. Here, as the case where the space velocity of the exhaust gas is slow in which almost all the fuel is combusted, there is mentioned a case where the internal combustion engine 1 is in an idle operation, or a case where the internal combustion engine 1 is in a decelerating operation.

Accordingly, in this embodiment, the injection of fuel for removal of clogging from the fuel supply valve 6 is carried out when the space velocity of the exhaust gas is equal to or less than a predetermined velocity, which is a threshold value based on which it is determined whether even if the fuel to be injected for removal of clogging is ignited by the ignition device 7, a part of the fuel may become unburned or not.

Here, the predetermined velocity is a threshold value of a space velocity of the exhaust gas based on which it is determined whether even if the fuel to be injected for removal of clogging is ignited by the ignition device 7, a part of the fuel may become unburned or not. When the space velocity of the exhaust gas is equal to or less than the predetermined velocity, if the fuel to be injected for removal of clogging is ignited by the ignition device 7, even a part of the fuel does not remain substantially unburned.

Figure 4:
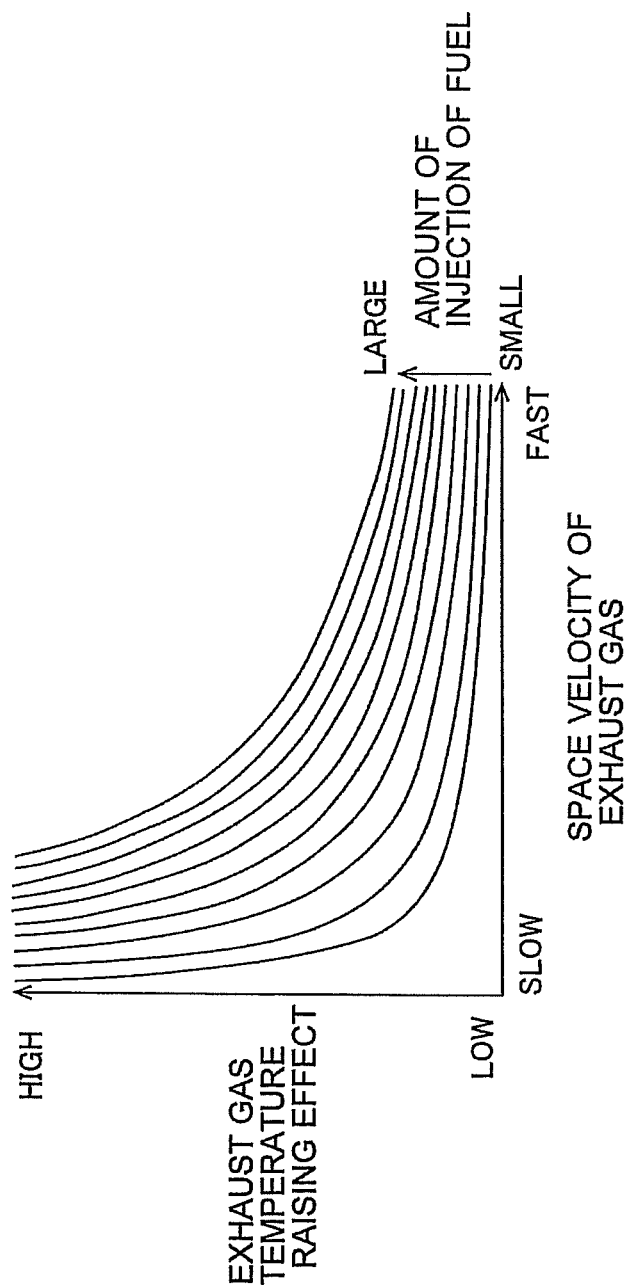
FIG. 4 is a view showing the relation between a space velocity of exhaust gas and an exhaust gas temperature raising effect according to a second embodiment of the present invention.

According to this embodiment, the injection of fuel for removal of clogging from the fuel supply valve 6 is carried out when the space velocity of the exhaust gas is equal to or less than the predetermined velocity, and hence, if fuel injected for removal of clogging is ignited by the ignition device 7, even a part of the fuel does not remain substantially unburned. As a result of this, the fuel injected from the fuel supply valve 6 for removing the clogging thereof is combusted when ignited by the ignition device 7, thus making it possible to avoid unburnt HC from being discharged to the downstream side. FIG. 4 is a view showing the relation between the space velocity of the exhaust gas and the temperature raising effect of the exhaust gas. When the space velocity of the exhaust gas is a slow velocity, the temperature raising effect of the exhaust gas is high, as shown in FIG. 4, so that the temperature of the exhaust gas can be raised to a more extent by the injection of fuel for removal of clogging. According to this, it is possible to raise the temperature of the exhaust gas which is insufficient or low in the internal combustion engine 1 with high thermal efficiency in recent years.

In addition, in this embodiment, the amount of fuel which is able to be combusted by being ignited by means of the ignition device 7, and which is the amount of fuel to be injected from the fuel supply valve 6 for removal of the clogging thereof is calculated by taking into consideration the phenomenon that as the space velocity of the exhaust gas increases, there increases a possibility that even if the fuel to be injected for removal of clogging is ignited by the ignition device 7, a part of the fuel may become unburned.

According to this embodiment, the amount of fuel which is able to be combusted by being ignited by means of the ignition device 7 is calculated in consideration of the space velocity of the exhaust gas, in such a manner that it becomes a small amount when the space velocity of the exhaust gas is a fast speed, whereas it becomes a large amount when the space velocity of the exhaust gas is a slow speed. As a result of this, as the space velocity of the exhaust gas becomes slower, the larger amount of fuel is injected from the fuel supply valve 6, so that it becomes easy to remove the clogging of the fuel supply valve 6. In addition, when a larger amount of fuel is injected from the fuel supply valve 6, the temperature of the exhaust gas can be raised to a much more extent.

Figure 5:
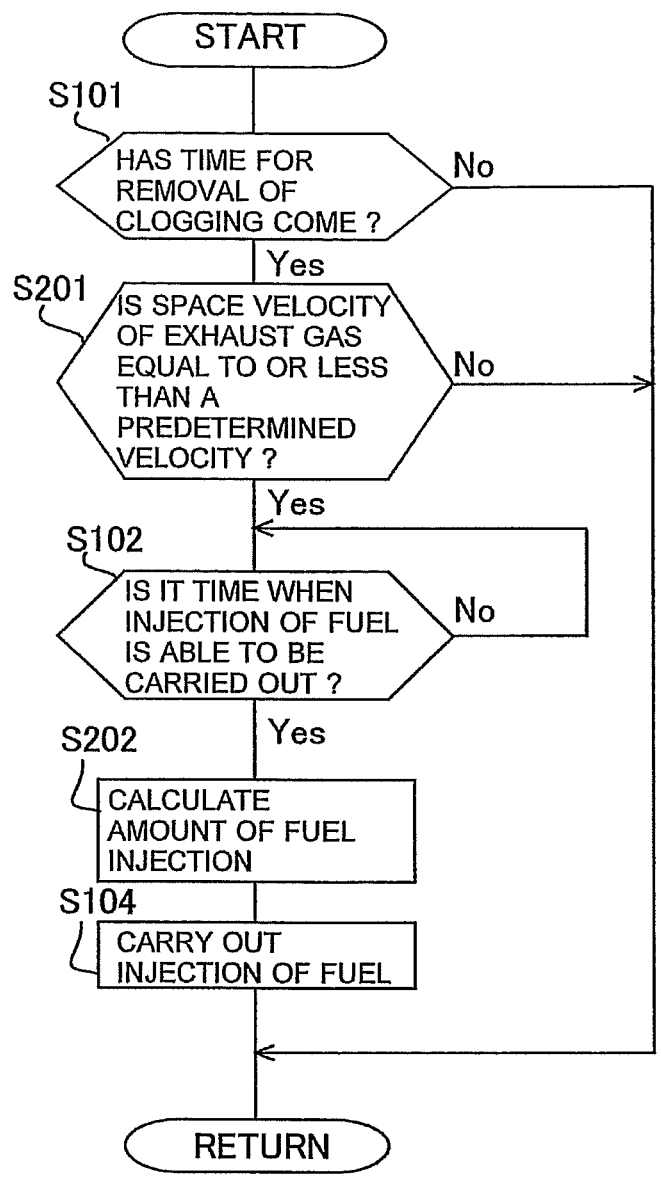
FIG. 5 is a flow chart showing a control routine 2 for removal of clogging of a fuel supply valve according to the second embodiment.

FIG. 5 is a flow chart showing a control routine 2 for removal of the clogging of the fuel supply valve. The control routine 2 for removal of the clogging of the fuel supply valve will be explained based on the flow chart shown in FIG. 5. This routine is repeatedly carried out by means of the ECU 9 at each predetermined time interval. Here, note that with respect to the same processing as in the control routine 1 for removal of the clogging of the fuel supply valve in the above-mentioned first embodiment, the detailed explanation of the processing is omitted.

When this routine is carried out, first in step S101, it is determined whether the time has come for removal of the clogging of the fuel supply valve 6. In step S101, in cases where an affirmative determination is made that the time has come for removal of the clogging of the fuel supply valve 6, the control routine shifts to step S201. On the other hand, in step S101, in cases where a negative determination is made that the time has not yet come for removal of the clogging of the fuel supply valve 6, this routine is once ended.

In step S201, it is determined whether the space velocity of the exhaust gas passing through the exhaust gas temperature raising apparatus 3 is equal to or lower than a predetermined velocity. The space velocity of the exhaust gas is calculated from the flow rate of the exhaust gas per unit volume. The flow rate of the exhaust gas is estimated based on the flow rate of intake air detected by the air flow meter 13. The predetermined velocity is a space velocity of the exhaust gas at the time when the operating state of the internal combustion engine 1 is an idle operation state or a deceleration operation state, for example, if the space velocity of the exhaust gas is equal to or less than the predetermined velocity.

In step S201, in cases where an affirmative determination is made that the space velocity of the exhaust gas is equal to or less than the predetermined velocity, the control routine shifts to step S102. On the other hand, in step S201, in cases where a negative determination is made that the space velocity of the exhaust gas is faster or larger than the predetermined velocity, this routine is once ended.

In step S102, it is determined whether it is the time when the injection of fuel for removal of clogging is able to be carried out. In step S102, in cases where an affirmative determination is made that it is the time when the injection of fuel for removal of clogging is able to be carried out, the control routine shifts to step S202. On the other hand, in step S102, in cases where a negative determination is made that it is the time when the injection of fuel for removal of clogging is not able to be carried out, the control routine returns to the processing of this step (i.e., the processing of this step is repeated).

In step S202, an amount of fuel (an amount of fuel injection) which is able to be combusted by being ignited by means of the ignition device 7, which is an amount of fuel to be injected for removal of clogging, is calculated. In this embodiment, the amount of fuel which is able to be combusted by being ignited by means of the ignition device 7 is set as a variable amount which varies according to the operating state of the internal combustion engine 1, and in the calculation thereof, the space velocity of the exhaust gas is taken into consideration. Thus, the amount of fuel which is able to be combusted by being ignited by means of the ignition device 7 is calculated based on the space velocity of the exhaust gas calculated in step S201. Specifically, a map has been prepared which defines in advance the relation between the space velocity of the exhaust gas and the amount of fuel which is able to be combusted by being ignited by means of the ignition device 7, which is obtained from the phenomenon that as the space velocity of the exhaust gas increases, there increases a possibility that even if the fuel to be injected for removal of clogging is ignited by the ignition device 7, a part of the fuel may become unburned. Then, the amount of fuel which is able to be combusted by being ignited by means of the ignition device 7 is calculated from a specific operating state of the internal combustion engine 1 by using this map.

Here, note that the amount of fuel which is able to be combusted by being ignited by means of the ignition device 7 may be calculated not only based on the space velocity of the exhaust gas in this second embodiment, but also based on the operating state of the internal combustion engine 1 in the first embodiment. In this second embodiment, however, it is considered that the influence based on the space velocity of the exhaust gas is great, and hence, the amount of fuel which is able to be combusted by being ignited by means of the ignition device 7 is calculated only based on the space velocity of the exhaust gas.

In addition, in this second embodiment, the injection of fuel for removal of clogging is limited to the case where the space velocity of the exhaust gas is equal to or less than the predetermined velocity, in the step of S201. Accordingly, the amount of fuel which is able to be combusted by being ignited by means of the ignition device 7 may be set to a fixed amount which is larger than a minimum fixed amount that is able to be combusted or burned in the entire operating region of the internal combustion engine 1, and which is able to be combusted or burned in cases where the space velocity of the exhaust gas is equal to or less than the predetermined velocity. According to this, too, when the space velocity of the exhaust gas is equal to or less than the predetermined velocity, a large amount of fuel is injected from the fuel supply valve 6, so that it becomes easy to remove the clogging of the fuel supply valve 6.

In step S104, the injection of fuel is carried out from the fuel supply valve 6 for removal of the clogging thereof. At this time, air is supplied from the air supply device 5, and at the same time, the fuel is ignited by the ignition device 7.

According to this routine as described above, when the space velocity of the exhaust gas is equal to or less than the predetermined velocity, fuel can be injected from the fuel supply valve 6 for removal of the clogging thereof, thereby making it possible to avoid unburnt HC from being discharged to the downstream side. In addition, at the time of injecting fuel from the fuel supply valve 6 for removal of the clogging thereof, a larger amount of fuel can be injected from the fuel supply valve 6, so that it becomes easy to remove the clogging of the fuel supply valve 6.

Third Embodiment

In a third embodiment, the amount of fuel to be injected from the fuel supply valve 6 for removal of the clogging thereof is set to an amount of fuel which is able to be combusted by being ignited by means of the ignition device 7, or an amount of fuel with which a part of the fuel that becomes unburned or uncombusted after ignited by the ignition device 7 is able to be oxidized and adsorbed by the exhaust gas purification catalyst 4. This is because even if the amount of fuel to be injected from the fuel supply valve 6 for removal of the clogging thereof is more than the amount of fuel which is able to be combusted by being ignited by means of the ignition device 7, but if the amount of fuel to be injected from the fuel supply valve 6 for removal of the clogging thereof is the amount of fuel with which a part of the fuel that becomes unburned or uncombusted after ignited by the ignition device 7 is able to be oxidized and adsorbed by the exhaust gas purification catalyst 4, it is possible to suppress unburnt HC from being discharged to the downstream side. In this third embodiment, the characteristic portion thereof will be explained while omitting the explanation of the portions which are the same as those of the above-mentioned embodiments.

Here, the exhaust gas purification catalyst 4 in this third embodiment is arranged in the exhaust passage 2 at a location downstream of the ignition device 7, and is able to oxidize and adsorb fuel.

In this embodiment, the amount of fuel to be injected from the fuel supply valve 6 for removal of the clogging thereof is set to an amount of fuel which is able to be combusted by being ignited by means of the ignition device 7, or an amount of fuel with which a part of the fuel that becomes unburned or uncombusted after ignited by the ignition device 7 is able to be oxidized and adsorbed by the exhaust gas purification catalyst 4.

Here, the amount of fuel with which a part of the fuel that becomes unburned or uncombusted after ignited by the ignition device 7 is able to be oxidized and adsorbed by the exhaust gas purification catalyst 4 is an amount of fuel with which a part of the fuel becomes unburned after being ignited by the ignition device 7 and flows into the exhaust gas purification catalyst 4, but this part of fuel is oxidized and adsorbed by the exhaust gas purification catalyst 4, so that almost no unburnt HC (unburnt fuel) is discharged to the downstream side, thus exerting no adverse effect on exhaust emissions.

According to this embodiment, at the time of injecting fuel from the fuel supply valve 6 for removal of the clogging thereof, an amount of fuel which is able to be combusted by being ignited by means of the ignition device 7, or an amount of fuel with which a part of the fuel that becomes unburned after ignited by the ignition device 7 is able to be oxidized and adsorbed by the exhaust gas purification catalyst 4, will be injected. As a result of this, the fuel injected from the fuel supply valve 6 for removal of the clogging thereof is combusted or burned when ignited by the ignition device 7, or a part of the fuel which becomes unburned after ignited by the ignition device 7 is oxidized and adsorbed by the exhaust gas purification catalyst 4, thus making it possible to suppress unburnt HC from being discharged to the downstream side. Accordingly, it is possible to suppress the deterioration of exhaust emissions due to the unburnt HC released into ambient atmosphere from the exhaust passage 2. In addition, an amount of fuel equal to or more than the amount of fuel which is able to be combusted by being ignited by means of the ignition device 7 is injected from the fuel supply valve 6, so that it becomes easy to remove the clogging of the fuel supply valve 6.

In addition, in this embodiment, the amount of fuel which is able to be combusted by being ignited by means of the ignition device 7, or the amount of fuel with which a part of the fuel that becomes unburned after ignited by the ignition device 7 is able to be oxidized and adsorbed by the exhaust gas purification catalyst 4, which is the amount of fuel to be injected from the fuel supply valve 6 for removal of the clogging thereof, is calculated in consideration of the active state of the exhaust gas purification catalyst 4.

According to this embodiment, an amount of fuel which is able to be combusted by being ignited by means of the ignition device 7, or an amount of fuel with which a part of the fuel that becomes unburned after ignited by the ignition device 7 is able to be oxidized and adsorbed by the exhaust gas purification catalyst 4, is calculated in consideration of the active state of the exhaust gas purification catalyst 4, in such a manner that it becomes a small amount when the active state of the exhaust gas purification catalyst 4 is low, or when the exhaust gas purification catalyst 4 is in an inactive state, whereas it becomes a large amount when the active state of the exhaust gas purification catalyst 4 is high. As a result of this, the higher the active state of the exhaust gas purification catalyst 4, the larger becomes the amount of fuel injected from the fuel supply valve 6, so that it becomes easy to remove the clogging of the fuel supply valve 6. In addition, when a larger amount of fuel is injected from the fuel supply valve 6, the temperature of the exhaust gas can be raised to a much more extent.

A control routine for removal of the clogging of the fuel supply valve according to this third embodiment becomes substantially the same as the control routine 1 for removal of the clogging of the fuel supply valve as shown in FIG. 3. However, only the content of the step of S103 is different, so an explanation thereof will be given below.

In step S103, an amount of fuel which is able to be combusted by being ignited by means of the ignition device 7, or an amount of fuel with which a part of the fuel that becomes unburned after ignited by the ignition device 7 is able to be oxidized and adsorbed by the exhaust gas purification catalyst 4, which is an amount of fuel (an amount of fuel injection) to be injected from the fuel supply valve 6 for removal of the clogging thereof is calculated. In this embodiment, the amount of fuel which is able to be combusted by being ignited by means of the ignition device 7, or the amount of fuel with which a part of the fuel that becomes unburned after ignited by the ignition device 7 is able to be oxidized and adsorbed by the exhaust gas purification catalyst 4, is set as a variable amount which varies according to the operating state of the internal combustion engine 1, and in the calculation thereof, the active state of the exhaust gas purification catalyst 4 is taken into consideration. Thus, the amount of fuel which is able to be combusted by being ignited by means of the ignition device 7, or the amount of fuel with which a part of the fuel that becomes unburned after ignited by the ignition device 7 is able to be oxidized and adsorbed by the exhaust gas purification catalyst 4, is calculated based on the operating state of the internal combustion engine 1 according to the detected values of the crank position sensor 10 and the accelerator position sensor 11 as well as the bed temperature of the exhaust gas purification catalyst 4 detected by the catalyst temperature sensor 12. Specifically, a map has been prepared which sets or defines in advance the relation between the active state of the exhaust gas purification catalyst 4 and the amount of fuel which is able to be combusted by being ignited by means of the ignition device 7, or the amount of fuel with which a part of the fuel that becomes unburned after ignited by the ignition device 7 is able to be oxidized and adsorbed by the exhaust gas purification catalyst 4, which has been obtained from the phenomenon that as the bed temperature of the exhaust gas purification catalyst 4 becomes higher, the active state of the exhaust gas purification catalyst 4 becomes higher. Then, the amount of fuel which is able to be combusted by being ignited by means of the ignition device 7, or the amount of fuel with which a part of the fuel that becomes unburned after ignited by the ignition device 7 is able to be oxidized and adsorbed by the exhaust gas purification catalyst 4, is calculated from the operating state of the internal combustion engine 1 and the bed temperature of the exhaust gas purification catalyst 4, by the use of this map.

Here, note that in this embodiment, the amount of fuel to be injected for removal of clogging is a variable amount, and many values are able to be used for it. However, the present invention is not limited to this, but in cases where the exhaust gas purification catalyst 4 is in an inactive state, the amount of fuel to be injected for removal of clogging may be set to a fixed amount of fuel which is able to be combusted by being ignited by means of the ignition device 7, whereas in cases where the exhaust gas purification catalyst 4 is in an active state, the amount of fuel to be injected for removal of clogging may be set to a fixed amount of fuel with which a part of the fuel that becomes unburned after ignited by the ignition device 7 is able to be oxidized and adsorbed by the exhaust gas purification catalyst 4. As a result of this, too, in cases where the exhaust gas purification catalyst 4 is in the active state, a large amount of fuel is injected from the fuel supply valve 6, so that it becomes easy to remove the clogging of the fuel supply valve 6.

Other Examples

Here, note that the exhaust gas temperature raising apparatus 3 is not limited to the construction of FIG. 1. FIG. 6 is a view showing the schematic construction of an exhaust gas temperature raising apparatus according to another example of the present invention. This exhaust gas temperature raising apparatus 3 is arranged in a space protruding from an exhaust passage 2, and is provided with, from an upstream side in the direction of flow of an exhaust gas, an air supply device 5, a fuel supply valve 6, an ignition device 7, and a combustion chamber 14 surrounding these devices and valve.

The air supply device 5 serves to supply air to the combustion chamber 14 from its upstream side from an air pump 51 through an air supply passage 52, so that the oxygen concentration of the exhaust gas in the combustion chamber 14 is caused to rise.

The fuel supply valve 6 is arranged in the combustion chamber 14, and serves to supply the fuel in an unillustrated fuel tank toward the exhaust passage 2. Here, note that there is no need to directly direct a fuel spray from the fuel supply valve 6 to the exhaust passage 2, but it just needs to be able to entrain the fuel from the fuel supply valve 6 in a gas flow and make it go to the exhaust passage 2.

The ignition device 7 is arranged in the combustion chamber 14, and serves to ignite (fire) the fuel supplied from the fuel supply valve 6 in the combustion chamber 14.

The combustion chamber 14 is a space which is connected to the exhaust passage 2, and which is arranged so as to protrude from the exhaust passage 2, wherein air from the air supply device 5 and fuel from the fuel supply valve 6 are supplied to the interior of the combustion chamber 14, and the ignition device 7 can ignite them in a state where they are mixed with each other, so that a combustion gas thus produced is made to flow into the exhaust passage 2. The combustion chamber 14, being arranged in the outside of the exhaust passage 2, serves to cause the air from the air supply device 5 and the fuel from the fuel supply valve 6 to be mixed with each other without being diffused in the entire interior of the exhaust passage 2. In addition, the combustion chamber 14 also serves to more decrease the influence of the exhaust gas flowing through the interior of the exhaust passage 2 with respect to the exhaust gas temperature raising apparatus 3. As a result of this, the exhaust gas temperature raising apparatus 3 can cause fuel to combust in a stable manner.

Others

The temperature raising apparatuses according to the present invention are not limited to the above-mentioned embodiments and examples, but can be subjected to various changes and modifications within the scope not departing from the gist of the present invention. In addition, the above-mentioned embodiments and examples are also embodiments and examples of a method for removal of fuel supply valve clogging according to the present invention.

DESCRIPTION OF THE REFERENCE SIGNS

1: internal combustion engine
2: exhaust passage
3: exhaust gas temperature raising apparatus
4: exhaust gas purification catalyst
5: air supply device
6: fuel supply valve
7: ignition device
8: combustion tube
9: ECU
10: crank position sensor
11: accelerator position sensor
12: catalyst temperature sensor
13: air flow meter
14: combustion chamber
51: air pump
52: air supply passage
61: nozzle body
62: needle
63: sack
64: injection hole

The invention claimed is:

1. An exhaust gas temperature raising apparatus comprising:
a fuel supply valve that supplies fuel to an exhaust passage of an internal combustion engine;
an ignition unit that ignites the fuel supplied from said fuel supply valve, and
an ECU, the ECU programmed to:
calculate, as an amount of the fuel to be injected from the fuel supply valve for removing clogging, an amount of fuel which is able to be combusted by being ignited by means of the ignition unit; and
cause fuel in the calculated amount to be injected and ignited by the ignition unit so that the clogging is removed,
wherein in cases where there is a possibility that clogging may occur in an injection hole of said fuel supply valve, fuel for removal of clogging is injected from said fuel supply valve; and
wherein an amount of the fuel to be injected from said fuel supply valve for removing clogging thereof is an amount of fuel which is able to be combusted by being ignited by means of said ignition unit.

2. The exhaust gas temperature raising apparatus as set forth in claim 1, wherein
the injection of fuel for removal of clogging from said fuel supply valve is carried out when a space velocity of the exhaust gas is equal to or less than a predetermined velocity, which is a threshold value based on which it is determined whether even if the fuel to be injected for removal of clogging is ignited by said ignition unit, a part of the fuel may become unburned or not.

3. The exhaust gas temperature raising apparatus as set forth in claim 1, wherein
the amount of fuel which is able to be combusted by being ignited by means of said ignition unit, which is the amount of the fuel to be injected from said fuel supply valve for removing clogging thereof, is calculated by taking into consideration a phenomenon that as the space velocity of the exhaust gas increases, there increases a possibility that even if the fuel to be injected for removal of clogging is ignited by said ignition unit, a part of the fuel may become unburned.

4. An exhaust gas temperature raising apparatus comprising:
a fuel supply valve that supplies fuel to an exhaust passage of an internal combustion engine; and
an ignition unit that ignites the fuel supplied from said fuel supply valve, and
an ECU, the ECU programmed to:
calculate, as an amount of the fuel to be injected from the fuel supply valve for removing clogging, an amount of fuel which is able to be combusted by being ignited by means of the ignition unit; and
cause fuel in the calculated amount to be injected and ignited by the ignition unit so that the clogging is removed,
wherein in cases where there is a possibility that clogging may occur in an injection hole of said fuel supply valve, fuel for removal of clogging is injected from said fuel supply valve;
wherein said apparatus further comprises a catalyst that is arranged in said exhaust passage at a location downstream of said ignition unit, and is able to oxidize and adsorb the fuel; and
wherein the amount of the fuel to be injected from said fuel supply valve for removal of the clogging thereof is an amount of fuel which is able to be combusted by being ignited by means of said ignition unit, or an amount of fuel with which a part of the fuel that becomes unburned after ignited by said ignition unit is able to be oxidized and adsorbed by said catalyst.

5. The exhaust gas temperature raising apparatus as set forth in claim 4, wherein
the amount of fuel which is able to be combusted by being ignited by means of said ignition unit, or the amount of fuel with which a part of the fuel that becomes unburned after ignited by said ignition unit is able to be oxidized and adsorbed by said catalyst, which is the amount of the fuel to be injected from said fuel supply valve for removal of the clogging thereof, is calculated in consideration of a state of activity of said catalyst.

6. A method for removal of fuel supply valve clogging in an exhaust gas temperature raising apparatus which is provided with:
a fuel supply valve that supplies fuel to an exhaust passage of an internal combustion engine;
an ignition unit that ignites the fuel supplied from said fuel supply valve, and
an ECU, the ECU programmed to:
calculate, as an amount of the fuel to be injected from the fuel supply valve for removing clogging, an amount of fuel which is able to be combusted by being ignited by means of the ignition unit; and
cause fuel in the calculated amount to be injected and ignited by the ignition unit so that the clogging is removed,
said method comprising:
a step in which in cases where there is a possibility that clogging may occur in an injection hole of said fuel supply valve, said fuel supply valve injects an amount of fuel which is able to be combusted by being ignited by means of said ignition unit in order to remove the clogging; and
a step in which said ignition unit ignites the fuel injected by said fuel supply valve.

7. A method for removal of fuel supply valve clogging in an exhaust gas temperature raising apparatus which is provided with:
- a fuel supply valve that supplies fuel to an exhaust passage of an internal combustion engine;
- an ignition unit that ignites the fuel supplied from said fuel supply valve;
- a catalyst that is arranged in said exhaust passage at a location downstream of said ignition unit, and is able to oxidize and adsorb the fuel, and
- an ECU, the ECU programmed to:
  - calculate, as an amount of the fuel to be injected from the fuel supply valve for removing clogging, an amount of fuel which is able to be combusted by being ignited by means of the ignition unit; and
  - cause fuel in the calculated amount to be injected and ignited by the ignition unit so that the clogging is removed, said method comprising:
- a step in which in cases where there is a possibility that clogging may occur in an injection hole of said fuel supply valve, said fuel supply valve injects an amount of fuel which is able to be combusted by being ignited by means of said ignition unit, or an amount of fuel with which a part of the fuel that becomes unburned after ignited by said ignition unit is able to be oxidized and adsorbed by said catalyst, in order to remove the clogging; and
- a step in which said ignition unit ignites the fuel injected by said fuel supply valve.

* * * * *